United States Patent
Barnes et al.

(10) Patent No.: US 11,838,429 B2
(45) Date of Patent: Dec. 5, 2023

(54) CERTIFICATE CHAIN COMPRESSION TO EXTEND NODE OPERATIONAL LIFETIME

(71) Applicant: ITRON, INC., Liberty Lake, WA (US)

(72) Inventors: Keith Barnes, Waseca, MN (US);
Garten Haeska, Lake City, MN (US);
Howard Brace, Minneapolis, MN (US);
Kalvinder Singh, Queensland (AU)

(73) Assignee: ITRON, INC., Liberty Lake, WA (US)

( * ) Notice: Subject to any disclaimer, the term of this patent is extended or adjusted under 35 U.S.C. 154(b) by 198 days.

(21) Appl. No.: 16/515,953

(22) Filed: Jul. 18, 2019

(65) Prior Publication Data

US 2021/0021434 A1    Jan. 21, 2021

(51) Int. Cl.
*H04L 29/06* (2006.01)
*H04L 9/32* (2006.01)
*H04L 9/00* (2022.01)

(52) U.S. Cl.
CPC ............ *H04L 9/3265* (2013.01); *H04L 9/006* (2013.01); *H04L 9/3268* (2013.01); *H04L 9/50* (2022.05)

(58) Field of Classification Search
CPC ..... H04L 9/3265; H04L 9/006; H04L 9/3268; H04L 2209/38; H04L 9/007
See application file for complete search history.

(56) References Cited

U.S. PATENT DOCUMENTS

| | | | | |
|---|---|---|---|---|
| 9,456,258 B2* | 9/2016 | Mani | ......................... | G01D 4/02 |
| 9,544,153 B1* | 1/2017 | Roskind | ................ | H04L 9/3268 |
| 9,860,730 B2* | 1/2018 | Mani | ................... | H04W 56/001 |
| 10,193,698 B1* | 1/2019 | Das | ......................... | G06F 21/33 |
| 11,276,084 B1* | 3/2022 | Burcham | ........... | G06Q 30/0269 |
| 2003/0041110 A1* | 2/2003 | Wenocur | ................. | H04L 65/80 |
| | | | | 709/206 |
| 2006/0036849 A1* | 2/2006 | Brown | .................. | H04L 9/3265 |
| | | | | 713/156 |

(Continued)

OTHER PUBLICATIONS

Felix Schreiner, DNSec—Data Security in Dynamic Industrial Networks, 2016, (Year: 2016).*

(Continued)

*Primary Examiner* — Malcolm Cribbs
*Assistant Examiner* — Hassan A Hussein
(74) *Attorney, Agent, or Firm* — Artegis Law Group, LLP (57) ABSTRACT

A battery-powered device (BPD) node compresses certificate chains to generate compressed certificate chains. The BPD node includes a compression dictionary that indexes various data entries that occur across many certificate chains and/or repeat within a particular certificate chain. The BPD node compresses a given certificate chain by replacing data entries within the given certificate chain with indices to corresponding data entries in the compression dictionary. The indices are smaller in size than the corresponding data entries. A neighboring BPD node also includes the compression dictionary and decompresses a compressed certificate chain by replacing indices included in the compressed certificate chain with the indexed data entries stored in the compression dictionary. Performing certificate exchanges with compressed certificate chains reduces the amount of limited battery power that is depleted during certificate exchanges, thereby extending BPD node operational lifetime and helping to prevent the need for premature battery replacement.

23 Claims, 7 Drawing Sheets

(56) References Cited

U.S. PATENT DOCUMENTS

| | | | |
|---|---|---|---|
| 2006/0047949 A1* | 3/2006 | Brown | H04L 63/0823 713/156 |
| 2008/0126378 A1* | 5/2008 | Parkinson | H03M 7/30 |
| 2008/0189545 A1* | 8/2008 | Parkinson | H04L 63/0823 713/158 |
| 2009/0249074 A1* | 10/2009 | Madhavan | H04L 9/3263 713/176 |
| 2009/0300014 A1* | 12/2009 | Chakrabarti | G06F 16/353 |
| 2012/0036354 A1* | 2/2012 | Suzuki | H04L 63/101 713/158 |
| 2012/0327956 A1* | 12/2012 | Vasudevan | H04L 67/1097 370/477 |
| 2013/0074197 A1* | 3/2013 | Shelton | G06F 21/125 726/28 |
| 2013/0205364 A1* | 8/2013 | Kiehtreiber | H04L 63/1433 726/1 |
| 2014/0330986 A1* | 11/2014 | Bowes | H04L 9/007 709/247 |
| 2015/0095650 A1* | 4/2015 | Nemiroff | G09C 1/00 713/175 |
| 2015/0256347 A1* | 9/2015 | Tseng | H04L 63/0823 713/158 |
| 2016/0021433 A1* | 1/2016 | Mani | H04W 84/18 340/870.07 |
| 2016/0192188 A1* | 6/2016 | Coulier | H04W 12/069 380/270 |
| 2016/0205178 A1* | 7/2016 | Mosko | H04L 67/1063 709/204 |
| 2016/0373931 A1* | 12/2016 | Edge | H04W 8/06 |
| 2017/0134170 A1* | 5/2017 | Subasic | H04L 9/3066 |
| 2018/0294977 A1* | 10/2018 | Uhr | G06F 21/33 |
| 2019/0180371 A1* | 6/2019 | Benkert | H04L 9/3263 |
| 2019/0268017 A1* | 8/2019 | Gopal | H04L 1/0057 |
| 2019/0387294 A1* | 12/2019 | Polland | H04L 41/0816 |
| 2021/0149580 A1* | 5/2021 | Fessel | G06F 3/0605 |
| 2021/0374262 A1* | 12/2021 | Maximov | G06F 21/629 |
| 2022/0046114 A1* | 2/2022 | Entelis | H04L 69/08 |
| 2022/0064176 A1* | 3/2022 | Sarlah | C07D 491/056 |
| 2022/0236957 A1* | 7/2022 | Konuri | G06F 16/2246 |

OTHER PUBLICATIONS

D. McGrew, M. Pritikin, "The Compressed X.509 Certificate Format", Cisco Systems, May 11, 2010, pp. 1-19, https://tools.ietf.org/html/draft-pritikin-comp-x509-00.

Graham Edgecombe, "Compressing X.509 certificates", Dec. 22, 2016, pp. 1-8, https://www.grahamedgecombe.com/blog/2016/12/22/compressing-x509-certificates.

International Search Report for application No. PCT/US2020/042347 dated Sep. 30, 2020.

Extended European Search Report for Application No. 20839940.2 dated Jul. 6, 2023.

McVeety et al., "Secure Channel Establishment in Disadvantaged Networks: TLS Optimization Using Intercepting Proxies", XP055081084, dated Aug. 18, 2009, 72 pages.

* cited by examiner

CERTIFICATE CHAIN COMPRESSION TO EXTEND NODE OPERATIONAL LIFETIME

BACKGROUND

Field of the Various Embodiments

Various embodiments relate generally to wireless networks and, more specifically, to certificate chain compression to extend node operational lifetime.

Description of the Related Art

A wireless network can include several different types of nodes that are coupled to one another and configured to wirelessly communicate with one another. Two types of nodes included in many wireless networks are mains-powered device (MPD) nodes and battery-powered device (BPD) nodes. MPD nodes are coupled to mains power, such as a power grid, and have continuous access to power when performing various node activities. BPD nodes are powered with battery cells, such as Lithium-ion battery cells, and have to perform node activities using only the limited amount of power available through those battery cells.

When a given BPD node joins a wireless network, the given BPD node typically identifies one or more neighboring nodes that already have network access and initiates a certificate exchange with the neighboring node(s). To initiate the certificate exchange with an identified neighboring node, the given BPD node transmits a certificate chain to the neighboring node. In response, the given BPD node receives a certificate chain from the neighboring node. Based on the exchanged certificate chains, the given BPD node and the neighboring node establish identity and authentication between each other, and the neighboring node can then provide the given BPD node with network access. Subsequently, additional nodes can join the wireless network by performing a certificate exchange with the given BPD node. Certificate chains usually include several certificates and can sometimes be quite large. In some instances, the certificate chains can be 900 bytes or greater in size.

One drawback of the above approach is that, when dealing with large certificate chains, a BPD node can expend a substantial amount of battery power transmitting a certificate chain to a given neighboring node and then receiving and processing a certificate chain transmitted back by that neighboring node. Expending the limited battery power of a BPD node in this fashion can reduce the operational life of the BPD node or can result in the battery cells of the BPD node needing premature replacement, which is time-consuming and expensive.

As the foregoing illustrates, what is needed in the art are more effective ways for BPD nodes to perform certificate exchanges in wireless networks.

SUMMARY

Some embodiments include a computer-implemented method for performing an authentication procedure when joining a wireless network, including compressing a certificate chain based on a first mapping to generate a compressed certificate chain, wherein the certificate chain includes a first data entry and the compressed certificate chain includes a first index in place of the first data entry, and transmitting the compressed certificate chain to a neighboring node to perform the authentication procedure with the neighboring node based on the first data entry.

At least one technological advantage of the disclosed techniques relative to the prior art is that, because a compressed certificate chain is smaller in size compared to a corresponding uncompressed certificate chain, a node consumes less power transmitting the compressed certificate chain to a neighboring node compared to transmitting the uncompressed certificate chain to the neighboring node.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

As noted above, a wireless mesh network can include several different types of nodes, including mains-powered device (MPD) nodes and battery-powered device (BPD) nodes. MPD nodes are coupled to mains power and therefore have access to a plentiful supply of power with which to perform various node activities, while BPD nodes include battery cells and therefore have access to a limited supply of battery power with which to perform various node activities. When a given BPD node joins the wireless mesh network, the given BPD node identifies one or more neighboring nodes and transmits a certificate chain to the neighboring node(s) as part of a certificate exchange. The certificate chain is used to authenticate the neighboring node(s) and facilitates encrypted communications between the given BPD node and the neighboring node(s). The certificate chain typically includes several certificates and can be quite large in size, in some instances 900 bytes or more.

One drawback associated with the large size of certificate chains is that BPD nodes sometimes have to expend a significant percentage of limited battery power in order to transmit certificate chains to neighboring node(s) when joining wireless mesh networks. Another drawback associated with the large size of certificate chains is that BPD nodes similarly have to expend a significant percentage of limited battery power in order to receive certificate chains during certificate exchanges. Because BPD nodes have a limited supply of battery power, expending power in order to transmit and receive large certificate chains can constraint the operational lifetime of BPD nodes or cause one or more batteries included in those BPD nodes to need premature replacement, thereby incurring maintenance overhead.

To address these issues, various embodiments include a BPD node that performs a compression operation with certificate chains to generate compressed certificate chains. The BPD node includes a compression dictionary that indexes various data entries that occur across many certificate chains and/or repeat within a particular certificate chain. The BPD node compresses a given certificate chain by replacing data entries within the given certificate chain with indices to corresponding data entries in the compression dictionary. The indices are smaller in size than the corresponding data entries. A neighboring BPD node also includes the compression dictionary and can decompress a compressed certificate chain by replacing indices included in the compressed certificate chain with the indexed data entries stored in the compression dictionary. BPD nodes dynamically update respective compression dictionaries to include any missing data entries, thereby increasing compression efficiency.

At least one technological advantage of the disclosed techniques relative to the prior art is that, because a compressed certificate chain is smaller in size compared to a corresponding uncompressed certificate chain, a BPD node consumes less power transmitting the compressed certificate chain to a neighboring node compared to transmitting the uncompressed certificate chain to the neighboring node. Similarly, the BPD node consumes less power when receiving and processing a compressed certificate chain transmitted back by the neighboring node compared to receiving and processing an uncompressed certificate chain transmitted back by the neighboring node. Accordingly, with the disclosed techniques, BPD nodes can conserve battery power during the certificate exchange process when joining a wireless network. These technological advantages represent one or more technological advancements over prior art approaches.

System Overview

Figure 1:
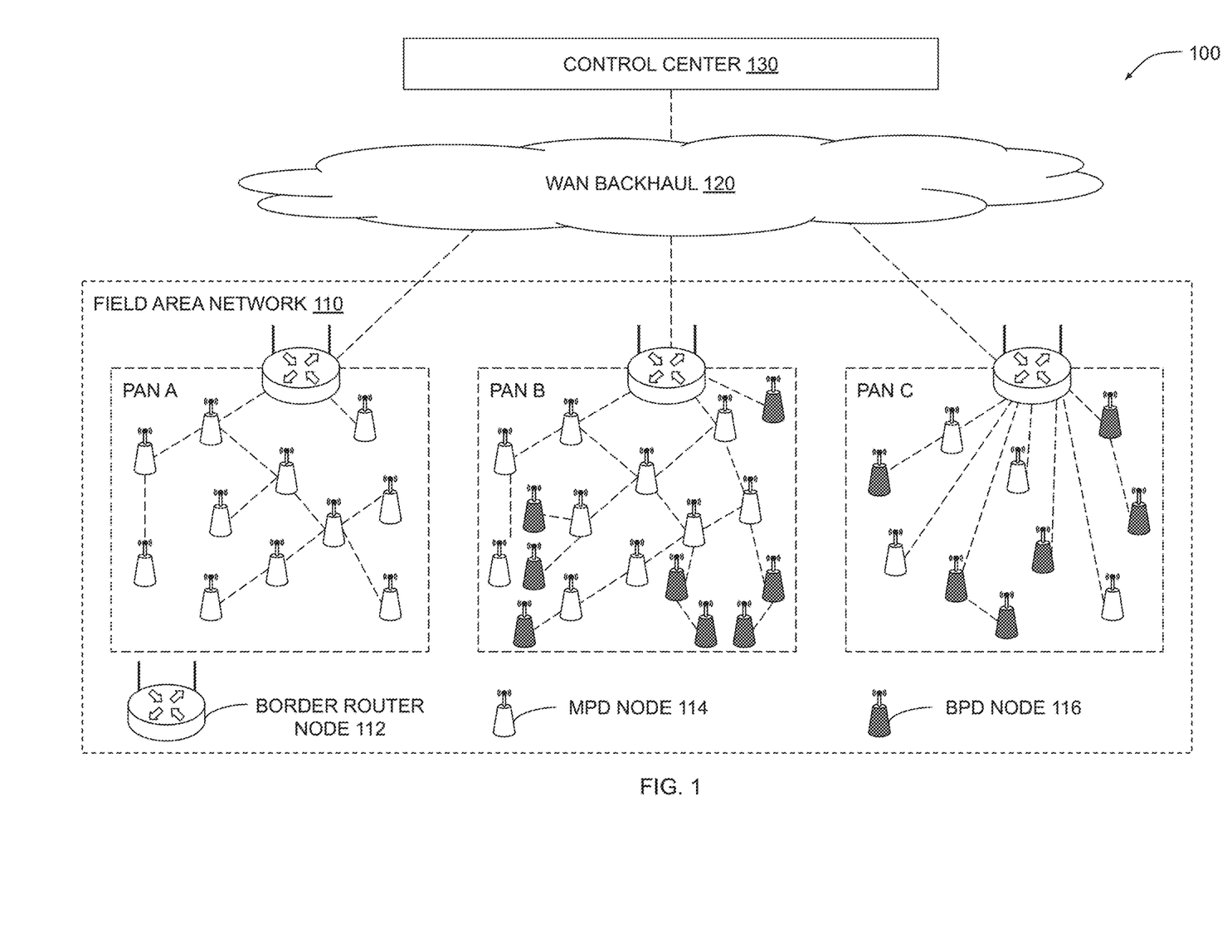
FIG. 1 illustrates a network system configured to implement one or more aspects of the present embodiments.

FIG. 1 illustrates a network system configured to implement one or more aspects of the present embodiments. As shown, network system 100 includes a field area network (FAN) 110, a wide area network (WAN) backhaul 120, and a control center 130. FAN 110 is coupled to control center 130 via WAN backhaul 120. Control center 130 is configured to coordinate the operation of FAN 110.

FAN 110 includes personal area network (PANs) A, B, and C. PANs A and B are organized according to a mesh network topology, while PAN C is organized according to a star network topology. Each of PANs A, B, and C includes at least one border router node 112 and one or more mains-powered device (MPD) nodes 114. PANs B and C further include one or more battery-powered device (BPD) nodes 116.

MPD nodes 114 draw power from an external power source, such as mains electricity or a power grid. MPD nodes 114 typically operate on a continuous basis without powering down for extended periods of time. BPD nodes 116 draw power from an internal power source, such as a battery. BPD nodes 116 typically operate intermittently and power down, go to very low power mode, for extended periods of time in order to conserve battery power.

MPD nodes 114 and BPD nodes 116 are coupled to, or included within, a utility distribution infrastructure (not shown) that distributes a resource to consumers. MPD nodes 114 and BPD nodes 116 gather sensor data related to the distribution of the resource, process the sensor data, and communicate processing results and other information to control center 130. Border router nodes 112 operate as access points to provide MPD nodes 114 and BPD nodes 116 with access to control center 130.

Any of border router nodes 112, MPD nodes 114, and BPD nodes 116 are configured to communicate directly with one or more adjacent nodes via bi-directional communication links. The communication links may be wired or wireless links, although in practice, adjacent nodes of a given PAN exchange data with one another by transmitting data packets via wireless radio frequency (RF) communications. The various node types are configured to perform a technique known in the art as "channel hopping" in order to periodically receive data packets on varying channels. As known in the art, a "channel" may correspond to a particular range of frequencies. In one embodiment, a node may compute a current receive channel by evaluating a Jenkins hash function based on a total number of channels and the media access control (MAC) address of the node.

Each node within a given PAN may implement a discovery protocol to identify one or more adjacent nodes or "neighbors." A node that has identified an adjacent, neighboring node may establish a bi-directional communication link with the neighboring node. Each neighboring node may update a respective neighbor table to include information concerning the other node, including the MAC address of the other node as well as a received signal strength indication (RSSI) of the communication link established with that node.

Nodes may compute the channel hopping sequences of adjacent nodes to facilitate the successful transmission of data packets to those nodes. In embodiments where nodes implement the Jenkins hash function, a node computes a current receive channel of an adjacent node using the total number of channels, the MAC address of the adjacent node, and a time slot number assigned to a current time slot of the adjacent node.

Any of the nodes discussed above may operate as a source node, an intermediate node, or a destination node for the transmission of data packets. A given source node may generate a data packet and then transmit the data packet to a destination node via any number of intermediate nodes (in mesh network topologies). The data packet may indicate a destination for the packet and/or a particular sequence of intermediate nodes to traverse in order to reach the destination node. In one embodiment, each intermediate node may include a forwarding database indicating various network routes and cost metrics associated with each route.

Nodes may transmit data packets across a given PAN and across WAN backhaul 120 to control center 130. Similarly, control center 130 may transmit data packets across WAN backhaul 120 and across any given PAN to a particular node included therein. As a general matter, numerous routes may exist which traverse any of PANs A, B, and C and include any number of intermediate nodes, thereby allowing any given node or other component within network system 100 to communicate with any other node or component included therein.

Control center 120 includes one or more server machines (not shown) configured to operate as sources for, or destinations of, data packets that traverse within network system 100. The server machines may query nodes within network system 100 to obtain various data, including raw or processed sensor data, power consumption data, node/network throughput data, status information, and so forth. The server machines may also transmit commands and/or program instructions to any node within network system 100 to cause those nodes to perform various operations. In one embodiment, each server machine is a computing device configured to execute, via a processor, a software application stored in a memory to perform various network management operations.

Figure 2:
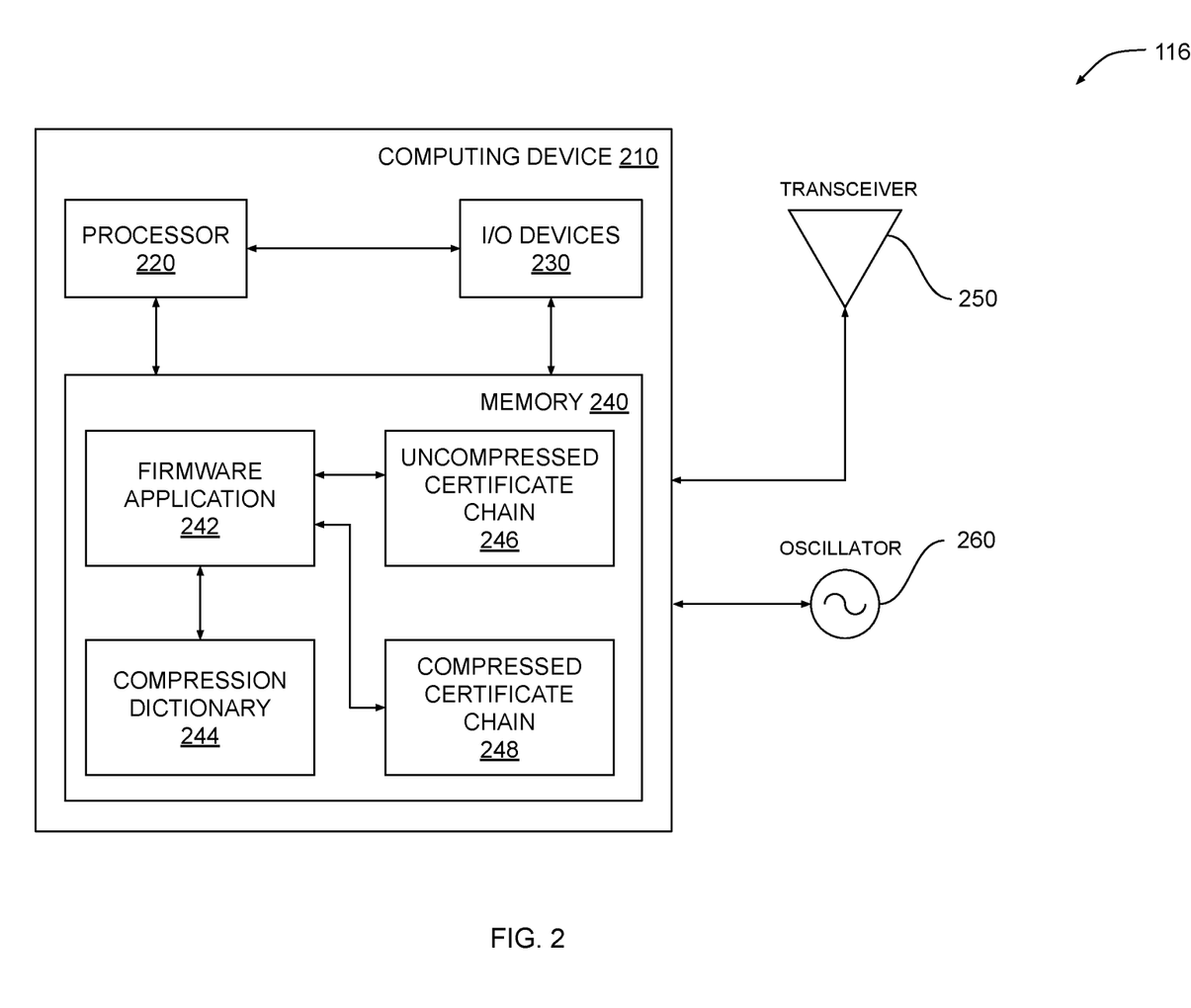
FIG. 2 is a more detailed illustration of one of the BPD nodes of FIG. 1, according to various embodiments.

Nodes may likewise include computing device hardware configured to perform processing operations and execute program code. Each node may further include various analog-to-digital and digital-to-analog converters, digital signal processors (DSPs), harmonic oscillators, transceivers, and any other components generally associated with RF-based communication hardware. FIG. 2 illustrates an exemplary BPD node 116 that may be included in network system 100.

FIG. 2 is a more detailed illustration of one of the BPD nodes of FIG. 1, according to various embodiments. As shown, BPD node 116 includes a computing device 210 coupled to a transceiver 250 and an oscillator 260. Computing device 210 coordinates the operations of BPD node 116. Transceiver 250 is configured to transmit and receive data packets across network system 100 using a range of channels and power levels. Oscillator 260 provides one or more oscillation signals according to which the transmission and reception of data packets can be scheduled.

Computing device 210 includes a processor 220, input/output (I/O) devices 230, and memory 240, coupled together. Processor 220 may include any hardware configured to process data and execute software applications. Processor 220 may include a real-time clock (RTC) (not shown) according to which processor 220 maintains an estimate of the current time. I/O devices 230 include devices configured to receive input, devices configured to provide output, and devices configured to both receive input and provide output. Memory 240 may be implemented by any technically feasible storage medium.

Memory 240 includes a firmware application 242, a compression dictionary 244, an uncompressed certificate chain 246, and a compressed certificate chain 248. Firmware application 242 includes program code that, when executed by processor 220, performs any of the node-oriented computing functionality described herein. During discovery, firmware application 242 interfaces with transceiver 250 to coordinate the exchange of data packets with other nodes across network system 100 based on timing signals generated by oscillator 260. Once the discovery process is complete, firmware application 242 causes the node to establish one or more encrypted communication channels with one or more neighboring nodes.

Compression dictionary 244 is a mapping between relatively small index values and relatively larger data entries that can be found in uncompressed certificate chain 246. Compression dictionary 244 is pre-loaded on BPD node 116 but can be dynamically updated during operation of BPD node 116. Uncompressed certificate chain 246 includes various data entries that can be used to verify the identity of a node within network system 100. Compressed certificate chain 248 is a compressed version of uncompressed certificate chain 246.

In one embodiment, uncompressed certificate chain 246 may include identifying information that BPD node 116 provides to a neighboring node in order to establish an encrypted communication channel with the neighboring node. In this embodiment, firmware application 242 may perform a compression operation with uncompressed certificate chain 246 using compression dictionary 244 to generate compressed certificate chain 248. In so doing, firmware application 242 replaces data entries included in uncompressed certificate chain 246 with indices to corresponding data entries in compression dictionary 244. The indices consume fewer bits than the data entries. Thus, compressed certificate chain 248 has a smaller size compared to uncompressed certificate chain 246.

In another embodiment, uncompressed certificate chain 246 may include identifying information that a neighboring node provides to BPD node 116 in order to establish an authenticated communication channel with BPD node 116. In this embodiment, firmware application 242 may receive compressed certificate chain 248 from the neighboring node and then perform a decompression operation with compressed certificate chain 248 using compression dictionary 244 to generate uncompressed certificate chain 246. In so doing, firmware application 242 replaces indices included in compressed certificate chain 248 with indexed data entries extracted from compression dictionary 244.

Firmware application 242 is configured to perform either or both of the above embodiments in order to compress certificate chains for transmission or to decompress received certificate chains. Various techniques for compressing and decompressing data are described in greater detail below in conjunction with FIGS. 4-5.

To establish an authenticated communication channel with a neighboring BPD node 116, firmware application 242 performs a certificate exchange procedure with the neighboring BPD node 116 to generate a shared secret key. Firmware application 242 can then encrypt data that is sent to the neighboring BPD node 116 using the shared secret key and decrypt data that is received from the neighboring BPD node 116 using the shared secret key. Techniques for establishing shared secret keys via certificate exchange procedures are well known to those skilled in the art and not covered here in additional detail.

When initiating the certificate exchange, firmware application 242 performs the compression operation described above with uncompressed certificate chain 246 to generate compressed certificate chain 248. Firmware application 242 transmits compressed certificate chain 248 to the neighboring BPD node 116, and the neighboring BPD node 116 performs the decompression operation described above with compressed certificate chain 248 to reconstruct uncompressed certificate chain 246. These operations are described in greater detail below in conjunction with FIG. 3.

Figure 3:
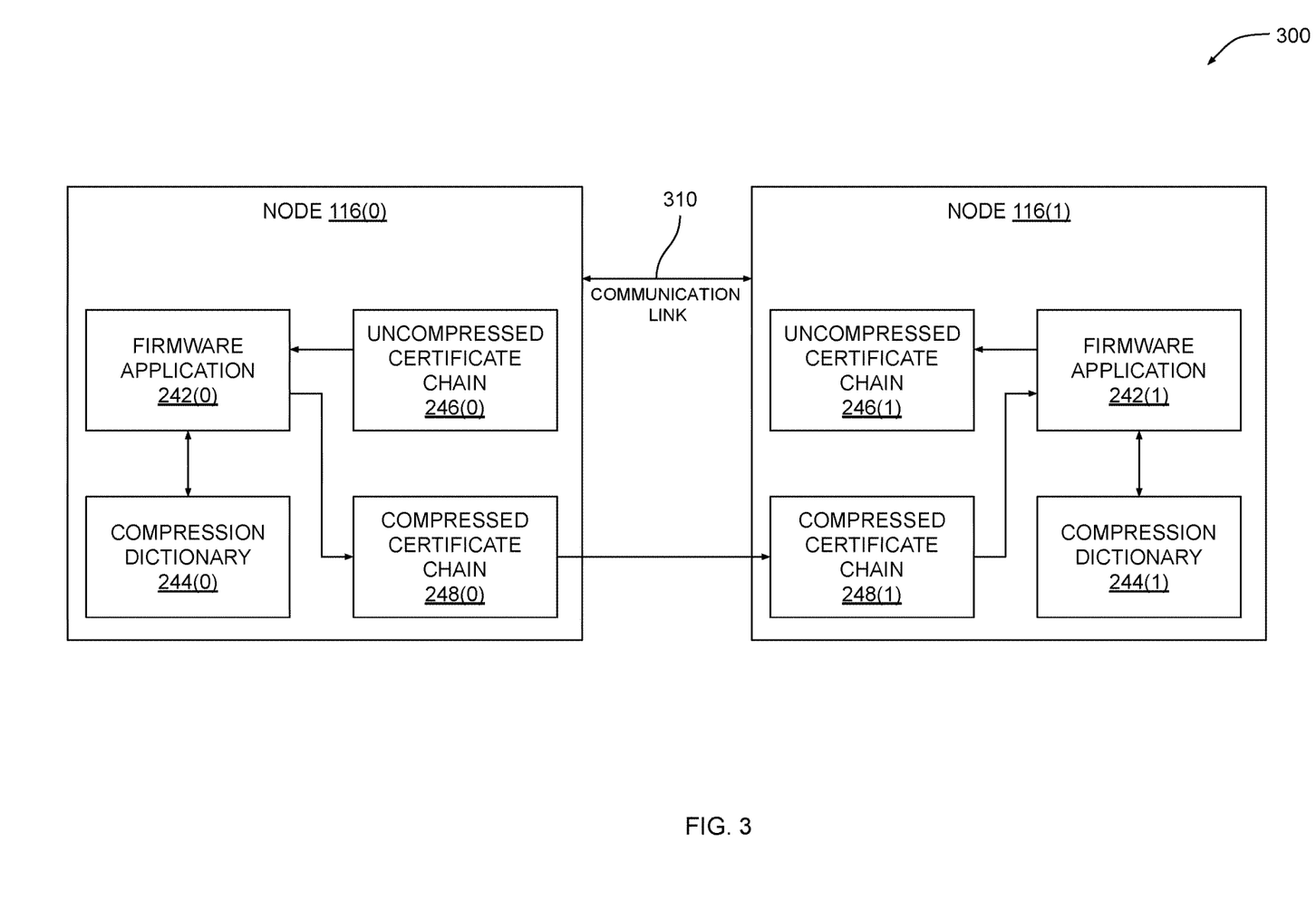
FIG. 3 illustrates how an instance of the BPD node of FIG. 2 initiates a certificate exchange procedure with another instance of the BPD node of FIG. 2, according to various embodiments.

FIG. 3 illustrates how an instance of the BPD node of FIG. 2 initiates a certificate exchange procedure with another instance of the BPD node of FIG. 2, according to various embodiments. As shown, a portion 300 of FAN 110 of FIG. 1 includes BPD nodes 116(0) and 116(1), or an MPD node, coupled together via a communication link 310. BPD node 116(0) includes firmware application 242(0), compression dictionary 244(0), uncompressed certificate chain 246(0), and compressed certificate chain 248(0). BPD node 116(1) includes firmware application 242(1), compression dictionary 244(1), uncompressed certificate chain 246(1), and compressed certificate chain 248(1).

In operation, firmware applications 242(0) and 242(1) establish communications between BPD nodes 116(0) and 116(1) via the discovery process described above in conjunction with FIG. 1. Firmware application 242(0) then initiates a certificate exchange procedure with firmware application 242(1) in order to establish an authenticated communication channel between BPD nodes 116(0) and 116(1) or between BPD and MPD nodes.

In particular, firmware application 242(0) performs the above-mentioned compression operation with uncompressed certificate chain 246(0) using compression dictionary 244(0) to generate compressed certificate chain 248(0). In one embodiment, uncompressed certificate chain 246(0) may include one or more X.509 certificates that include various fields and corresponding field values related to cryptographically securing communications between two or more entities. Firmware application 242(0) encodes compressed certificate chain 248(0) for transmission via communication link 310 and transmits the encoded version of compressed certificate chain 248(0) to BPD node 116(0).

Firmware application 242(1) within BPD node 116(1) decodes the encoded version of compressed certificate chain 248(0) from communication link 310 to generate compressed certificate chain 248(1). Under nominal conditions, compressed certificate chain 248(1) is a copy of compressed certificate chain 248(0).

Firmware application 242(1) then performs the above-mentioned decompression operation with compressed certificate chain 248(1) using compression dictionary 244(1) to generate uncompressed certificate chain 246(1). Under nominal conditions, uncompressed certificate chain 246(1) is a copy of uncompressed certificate chain 246(0). Accordingly, in one embodiment, uncompressed certificate chain 246(1) may similarly include one or more X.509 certificates that include various fields and corresponding field values related to cryptographically securing communications between two or more entities.

Using uncompressed certificate chain 246(1), firmware application 242(1) is configured to verify the identity of BPD node 116(0) and to establish an authenticated communication channel between BPD nodes 116(0) and 116(1) using techniques known to those skilled in the art. In one embodiment, BPD node 116(1) may transmit a compressed certificate to BPD node 116(0) that can be used to verify the identity of BPD node 116(1) and can be used to establish an authenticated and/or encrypted communication channel between BPD nodes 116(0) and 116(1).

Importantly, compressed certificate chain 248(0) can be significantly smaller than uncompressed certificate chain 246(0). For example, compressed certificate chain 248(0) could have a size that is 50% of the size of uncompressed certificate chain 246(0). Accordingly, BPD node 116(0) consumes less battery power when transmitting compressed certificate chain 248(0) than would otherwise be consumed in transmitting that certificate chain in uncompressed form. Similarly, BPD node 116(1) consumes less battery power when receiving and processing compressed certificate chain 248(1) than would otherwise be consumed in receiving and processing that certificate chain in uncompressed form. For these reasons, the disclosed techniques conserve the limited supply of battery power associated with BPD nodes 116(0) and 116(1) and therefore extend the operational lifetimes of BPD nodes 116(0) and 116(1).

Firmware application 242 of FIG. 2 performs both the compression and decompression operations described above in conjunction with FIGS. 2-3. In so doing, firmware application 242 can operate using a static portion of compression dictionary 242, as described below in conjunction with FIG. 4, and additionally using a dynamic portion of compression dictionary 242, as described below in conjunction with FIG. 5.

Compressing and Decompressing Via a Compression Dictionary

Figure 4:
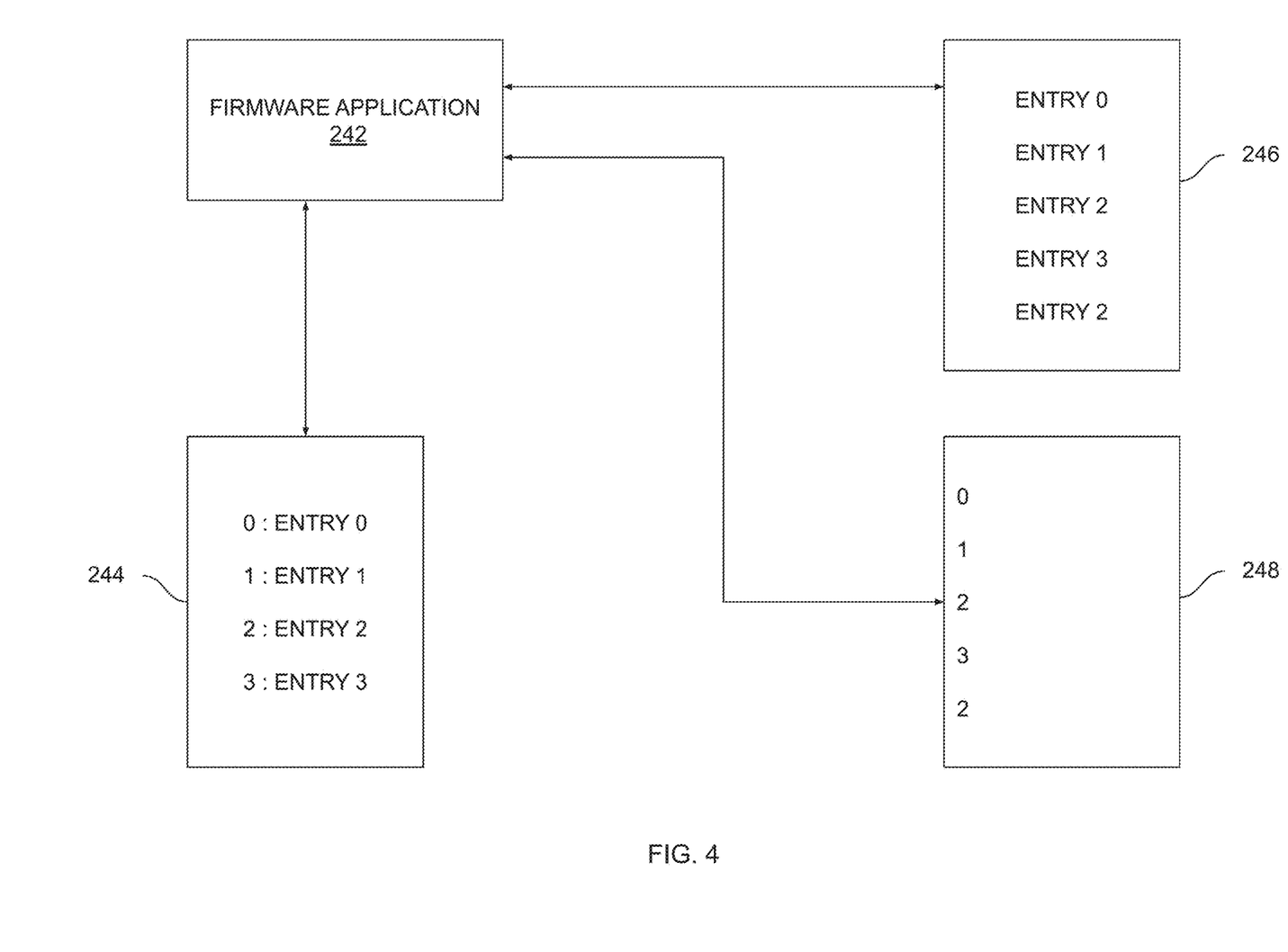
FIG. 4 illustrates how the firmware application of FIG. 2 compresses and decompresses certificate chains using a compression dictionary, according to various embodiments.

FIG. 4 illustrates how the firmware application of FIG. 2 compresses and decompresses certificate chains using a compression dictionary, according to various embodiments. As shown, compression dictionary 244 includes an exemplary mapping between indices 0-3 and respective data entries 0-3. Uncompressed certificate chain 246 includes data entries 0-3, where data entry 2 repeats once. Compressed certificate chain 248 includes indices 0-3, where index 2 repeats once.

In one embodiment, firmware application 242 may compress uncompressed certificate chain 246 for transmission to a neighboring node. In this embodiment, firmware application 242 may perform a compression operation by replacing data entries included in uncompressed certificate chain 246 with corresponding indices from compression dictionary 244. The indices consume a fewer number of bits than the corresponding data entries, causing compressed certificate chain 248 to be smaller than uncompressed certificate chain 246.

In another embodiment, firmware application 242 may decompress compressed certificate chain 248 upon receipt from a neighboring node. In this embodiment, firmware application 242 may perform a decompression operation by replacing indices included in compressed certificate chain 248 with corresponding data entries from compression dictionary 244.

According to the above embodiments, firmware application 242 may compress uncompressed certificate chains for transmission to other nodes and decompress compressed certificate chains received from other nodes.

Compression dictionary 244 is pre-populated with mappings between indices and data entries that recur across certificate chains and is pre-loaded onto each BPD node 116. Data entries that recur across certificate chains could include, for example, various data associated with BPD nodes 116, such as a manufacturer name associated with BPD nodes 116 or a product line name associated with BPD nodes 116, among others. In one embodiment, compression dictionary 244 may be at least partially populated at manufacture time by performing a frequency analysis across all data entries included in any certificates with which BPD nodes 116 are configured to use for authentication and encryption purposes and then indexing those data entries within compression dictionary 244.

In some situations, certificate chains may include data entries that recur across certificate chains but are not included in the pre-populated portion of the compression dictionary 244. Such data entries could include, for example, the name of a corporation that owns and/or operates BPD nodes 116 or other customer-specific information. In these situations, firmware application 242 can dynamically update compression dictionary 244 with these recurring data entries, as described below in conjunction with FIG. 5.

Figure 5:
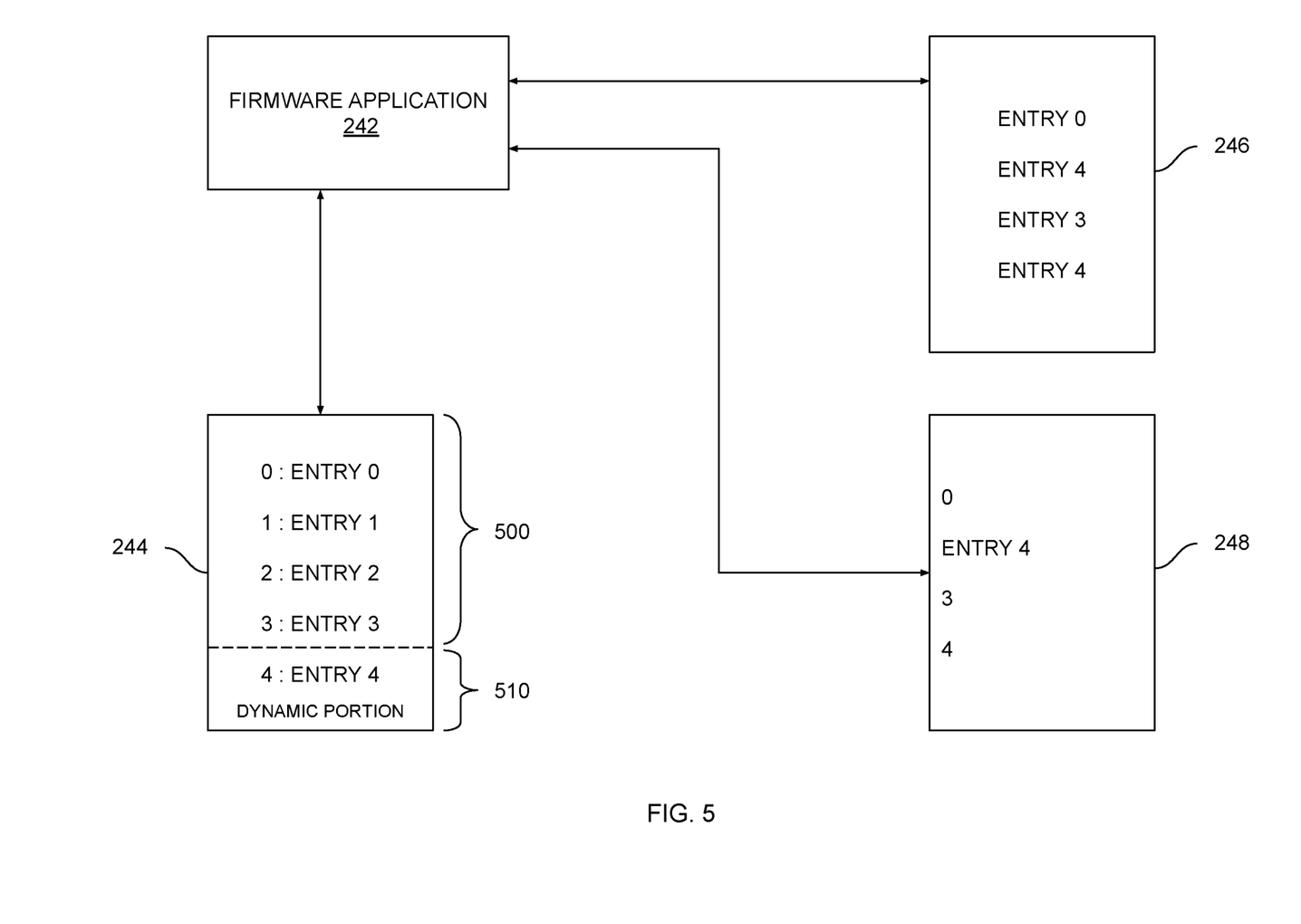
FIG. 5 illustrates how the firmware application of FIG. 2 compresses and decompresses certificate chains using static and dynamic portions of a compression dictionary, according to various embodiments.

FIG. 5 illustrates how the firmware application of FIG. 2 compresses and decompresses certificate chains using a static portion and a dynamic portion of a compression dictionary, according to various embodiments. As shown, compression dictionary 244 includes a static portion 500 that includes the pre-populated exemplary mapping between indices 0-3 and respective data entries 0-3 that is shown in FIG. 4. Compression dictionary 244 also includes a dynamic portion 510 that firmware application 242 populates with indexed data entries upon detecting a data entry that is not present in compression dictionary 244, as described in greater detail below. Uncompressed certificate chain 246 includes data entry 0, data entry 4, and data entry 3, and data entry 4 repeats once. Compressed certificate chain 248 includes index 0, data entry 4, index 3, and index 4.

In embodiments where firmware application 242 compresses uncompressed certificate chain 246 for transmission to a neighboring node, firmware application may replace data entries included in uncompressed certificate chain 246 with corresponding indices from compression dictionary 244, in like fashion as described above in conjunction with FIG. 5. In addition, if firmware application 242 detects a data entry during compression that is not included in compression dictionary 244, firmware application 242 indexes that data entry in dynamic portion 510 of compression dictionary 244. In the example shown, during the compression operation, firmware application 242 could parse uncompressed certificate dictionary 246 and determine that data entry 4 is not indexed in compression dictionary 244. Firmware application 242 would then add data entry 4 to dynamic portion 510 of compression dictionary 244, indexed via index 4. When indexing a new data entry in this manner, firmware application 242 includes the first occurrence of the raw data entry in compressed certificate chain 248 to allow a receiving BPD node 116 to detect that data entry and then index the data entry accordingly. Subsequently, firmware application 242 includes the index for that data entry in compressed certificate chain 248 in the manner shown.

In other embodiments where firmware application 242 decompresses compressed certificate chain 248 upon receipt from a neighboring node, firmware application 242 is required to replace indices included in compressed certificate chain 248 with corresponding data entries from compression dictionary 244. Those data entries will include any indexed data entries found in either static portion 500 or dynamic portion 510 of compression dictionary 244. In addition, if firmware application 242 identifies a raw data entry within compressed certificate chain 248 during decompression, firmware application 242 indexes that data entry in dynamic portion 510 of compression dictionary 244. Indexing such data entries allows firmware application 242 to map subsequent indices to that data entry. In the example shown, during the decompression operation, firmware application 242 could add data entry 4 to dynamic portion 510, indexed via index 4, and then subsequently map index 4 to data entry 4 when index 4 is subsequently detected. In some embodiments, firmware application 242 may flush dynamic portion 510 of compression dictionary 244 when the certificate exchange is complete.

Referring generally to FIGS. 4-5, firmware application 242 can be configured to implement either or both of the above-described techniques in order to compress and decompress certificate chains, according to various embodiments. The disclosed techniques allow firmware application 242 to decrease the size of a certificate chain prior to transmission, thereby reducing the amount of battery power needed to transmit the certificate chain. The disclosed techniques also allow firmware application 242 to receive and process compressed certificate chains, thereby decreasing the amount of battery power needed to implement a certificate exchange compared to prior art techniques.

In one embodiment, decreasing the size of certificate chains allows BPD nodes 116 to forego caching certificate chains. For example, a given BPD node 116 could receive a compressed certificate chain, determine that the certificate chain is compressed, and then prevent the compressed certificate chain from being cached. In another embodiment, a given BPD node 116 may store or cache a compressed portion of a certificate or certificate chain and/or other authentication data between security protocol state transitions. For example, the given BPD node 116 could cache a MAC address portion of a certificate chain. In yet another embodiment, firmware application 242 may implement elliptic curve (EC) point compression on the public key when compressing certificate chains. Persons skilled in the art will understand how the techniques described herein can be implemented to improve the effectiveness with which certificates can be transmitted in any number of technically feasible usage scenarios beyond those described above.

Compressing an Uncompressed Certificate Chain

Figure 6:
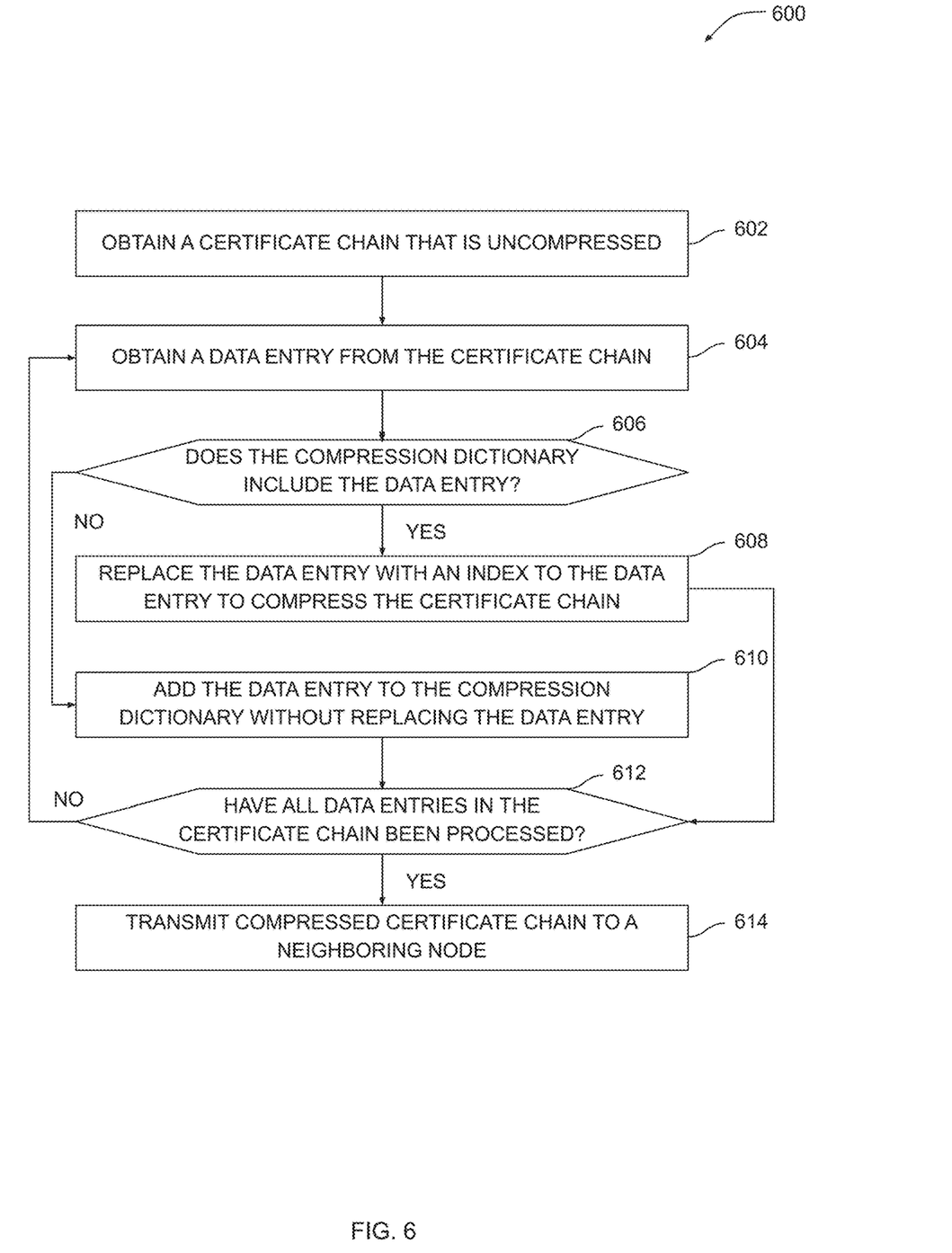
FIG. 6 is a flow diagram of method steps for compressing an uncompressed certificate chain, according to various embodiments.

FIG. 6 is a flow diagram of method steps for compressing an uncompressed certificate chain, according to various embodiments. Although the method steps are described in conjunction with the systems of FIGS. 1-5, persons skilled in the art will understand that any system configured to perform the method steps in any order falls within the scope of the present embodiments.

As shown, a method 600 begins at step 602, where firmware application 242 within a BPD node 116 obtains a certificate chain that is uncompressed. The certificate chain may be issued to the BPD node 116 at the time of manufacture, or the certificate chain may be issued to the BPD node 116 upon first joining FAN 110. The certificate chain generally includes information that the BPD node 116 can use for authentication, authorization, and encryption operations.

At step 604, firmware application 242 obtains a data entry from the certificate chain. The data entry can include any technically feasible form of data. For example, the data entry could be a key/value pair, a field name and corresponding field value, a line of comma-separated values, a data string, and so forth. In one embodiment, the data entry may be a field and/or corresponding field value derived from an X.509 certificate.

At step 606, firmware application 242 determines whether compression dictionary 244 includes the data entry. Compression dictionary 244 includes a static portion 500 that is pre-populated at the time of manufacture of the BPD node 116 and configured to include data entries that recur across certificates and certificates chain with which BPD node 116 is configured use during operation. Compression dictionary 244 also includes a dynamic portion 510 that firmware application 242 can update to include data entries dynamically determined to recur.

If at step 606 firmware application 242 determines that compression dictionary 244 includes the entry, then the method 600 proceeds to step 608. At step 608, firmware application 242 replaces the data entry with an index to the data entry to compress the certificate chain. The index to the data entry maps to the data entry in compression dictionary 244. The index to the data entry generally consumes fewer bits than the data entry itself, thereby reducing the amount of bits needed to represent the certificate chain. The method 600 proceeds from step 608 to step 612, described below.

If at step 606 firmware application 242 determines that compression dictionary 244 does not include the data entry, then the method 600 proceeds to step 610. At step 610, firmware application 242 adds the data entry to dynamic portion 510 of compression dictionary 244 without replacing first occurrence of the data entry in the compressed certificate chain. Firmware application 242 does not replace the first occurrence of the data entry in order to allow a receiving BPD node 116 to detect the data entry and perform a similar update to the dynamic portion of a compression dictionary associated with the receiving BPD node 116. The method 600 proceeds from step 610 to step 612, described below.

At step 612, firmware application 242 determines whether all data entries in the certificate chain been processed. If any data entries remain, then the method 600 returns to step 604 and proceeds as described above. Otherwise, the method 600 proceeds to step 614 where firmware application 242 transmits the compressed certificate chain to a neighboring BPD node 116. In this manner, the BPD node 116 can initiate a certificate exchange in order to authenticate and proceed to join a wireless network while conserving battery power. Upon receipt of a compressed certificate chain, a BPD node 116 implements the techniques described below in conjunction with FIG. 7 to decompress the compressed certificate chain.

Decompressing a Compressed Certificate Chain

Figure 7:
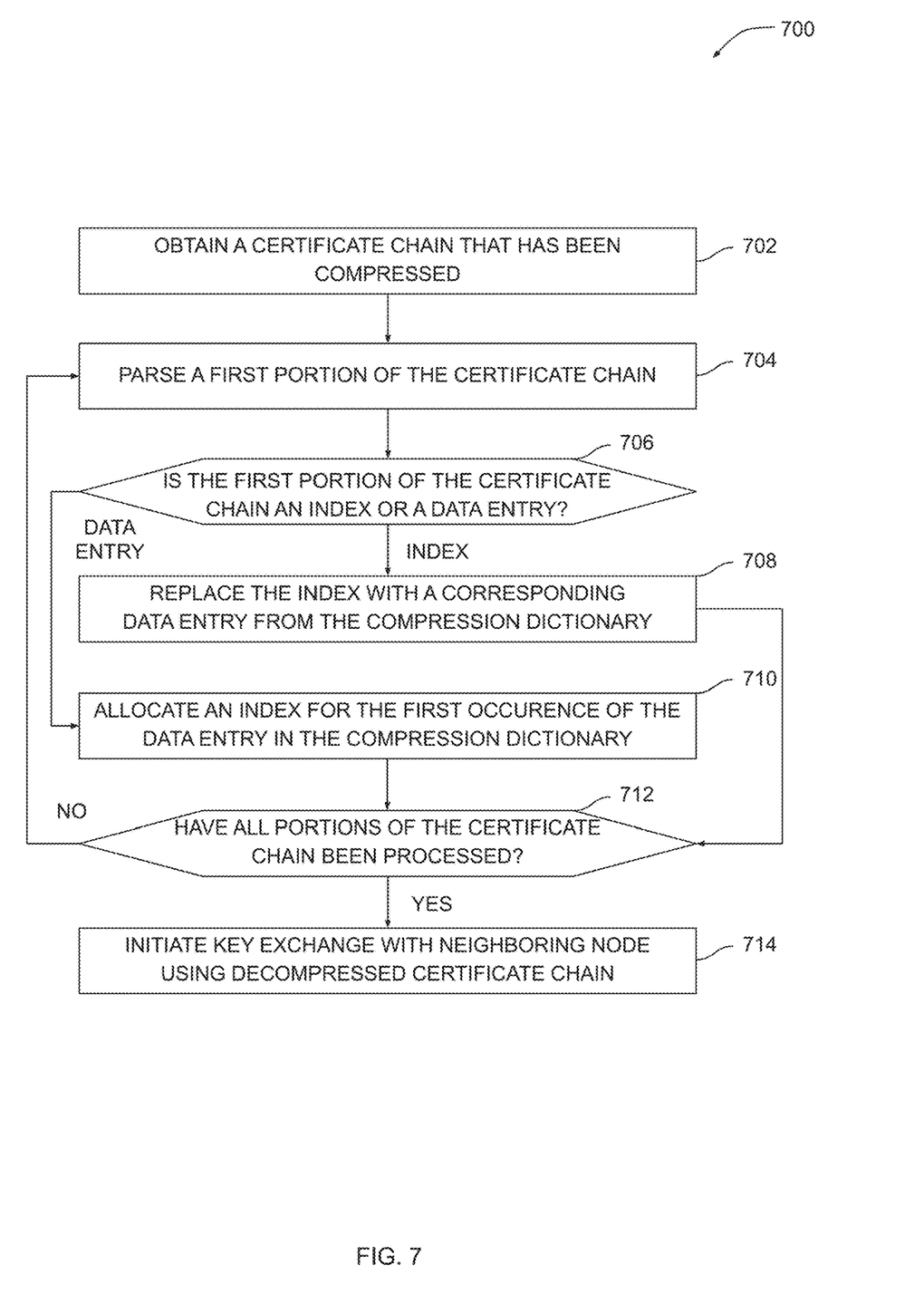
FIG. 7 is a flow diagram of method steps for decompressing a compressed certificate chain, according to various embodiments.

FIG. 7 is a flow diagram of method steps for decompressing a compressed certificate chain, according to various embodiments. Although the method steps are described in conjunction with the systems of FIGS. 1-5, persons skilled in the art will understand that any system configured to perform the method steps in any order falls within the scope of the present embodiments.

As shown, a method 700 begins at step 702, where firmware application 242 within a BPD node 116 obtains a certificate chain that has been compressed. The certificate chain is compressed using the technique described above in conjunction with FIG. 6. Accordingly, the certificate chain can include indices into compression dictionary 244 as well as data entries that should be added to dynamic portion 510 of compression dictionary 244.

At step 704, firmware application 242 parses a first portion of the certificate chain. As mentioned, the certificate chain can include both indices and data entries. Accordingly, the first portion could be an index into compression dictionary 244 or a data entry. At step 706, firmware application 242 determines whether the first portion of the certificate chain is an index or a data entry.

If at step 706 firmware application 242 determines that the first portion of the certificate chain is an index, then the method proceeds to step 708. At step 708, firmware application 242 replaces the index with a corresponding data entry derived from compression dictionary 244. The corresponding data entry could reside in static portion 500 of compression dictionary 244 or dynamic portion 510 of compression dictionary 244. Because the corresponding data entry has a larger size than the index, replacing the index with the corresponding data entry in the manner described decompresses the certificate chain to a certain extent. The method 700 proceeds from step 708 to step 712, described below.

If at step 706 firmware application 242 determines that the first portion of the certificate chain is a data entry, then the method proceeds to step 710. At step 710, firmware application 242 allocates an index for the first occurrence of the data entry and associates the data entry with the newly allocated index. If the index subsequently appears in the certificate chain, firmware application 242 can map the index to the data entry. The method proceeds from step 710 to step 712, described below.

At step 712, firmware application 242 determines whether all portions of the certificate chain been processed. If any portions remain, then the method 700 returns to step 704 and proceeds as described above. Otherwise, the method 700 proceeds to step 714 where firmware application 242 initiates a key exchange with a neighboring BPD node using the decompressed certificate chain.

Referring generally to FIGS. 6-7, firmware application 242 within a BPD node 116 implements both the compression operations associated with the method 600 and the decompression methods associated with the method 700 in order to facilitate power-efficient certificate exchanges. Moreover, because firmware application 242 implements certificate exchanges using compressed certificate chains, firmware application 242 can implement certificate exchanges faster than possible with conventional techniques. Accordingly, a given BPD node 116 can join or re-join FAN 110 faster when using the disclosed techniques, thereby increasing network uptime.

In sum, a BPD node performs a compression operation with certificate chains to generate compressed certificate chains. The BPD node includes a compression dictionary that indexes various data entries that occur across many certificate chains and/or repeat within a particular certificate chain. The BPD node compresses a given certificate chain by replacing data entries within the given certificate chain with indices to corresponding data entries in the compression dictionary. The indices are smaller in size than the corresponding data entries. A neighboring BPD node also includes the compression dictionary and can decompress a compressed certificate chain by replacing indices included in the compressed certificate chain with the indexed data entries stored in the compression dictionary. In some modes of operation, BPD nodes dynamically update respective compression dictionaries to include any missing data entries, thereby increasing compression efficiency.

At least one technological advantage of the disclosed techniques relative to the prior art is that, because a compressed certificate chain is smaller in size compared to a corresponding uncompressed certificate chain, a BPD node consumes less power transmitting the compressed certificate chain to a neighboring node compared to transmitting the uncompressed certificate chain to the neighboring node. Similarly, the BPD node consumes less power when receiving and processing a compressed certificate chain transmitted back by the neighboring node compared to receiving and processing an uncompressed certificate chain transmitted back by the neighboring node. Accordingly, with the disclosed techniques, BPD nodes can conserve battery power during the certificate exchange process when joining a wireless network. These technological advantages represent one or more technological advancements over prior art approaches.

1. Some embodiments include a computer-implemented method for performing an authentication procedure when joining a wireless network, comprising compressing a certificate chain based on a first mapping to generate a compressed certificate chain, wherein the certificate chain includes a first data entry and the compressed certificate chain includes a first index in place of the first data entry, and transmitting the compressed certificate chain to a neighboring node to perform the authentication procedure with the neighboring node based on the first data entry.

2. The computer-implemented method of clause 1, wherein first data entry includes a greater number of bits than the size of the first index in bits, and the certificate chain includes a greater number of bits than the compressed certificate chain.

3. The computer-implemented method of any of clauses 1-2, wherein the certificate chain comprises a chain of X.509 certificates, the first data entry comprises at least one of a field name and a field value included in the chain of X.509 certificates, and wherein the authentication procedure comprises a certificate exchange that, when completed, establishes an authenticated communication channel with the neighboring node.

4. The computer-implemented method of any of clauses 1-3, wherein compressing the certificate chain comprises determining that the first mapping includes the first data entry, determining that the first data entry corresponds to the first index in the first mapping, and replacing the first data entry with the first index in the certificate chain.

5. The computer-implemented method of any of clauses 1-4, wherein compressing the certificate chain comprises identifying a second data entry included in the certificate chain, determining that the first mapping does not include the second data entry, and incorporating the second data entry into the first mapping at a position that corresponds to a second index.

6. The computer-implemented method of any of clauses 1-5, further comprising flushing the second data entry and the second index from the first mapping when the authentication procedure has completed.

7. The computer-implemented method of any of clauses 1-6, wherein the first mapping is pre-populated with a first set of data entries prior to compressing the certificate chain, wherein compressing the certificate chain comprises dynamically populating the first mapping with a second set of data entries, and further comprising removing the second set of data entries from the first mapping when the authentication procedure has completed.

8. The computer-implemented method of any of clauses 1-7, further comprising decompressing, at the neighboring node, the compressed certificate chain based on a second mapping to generate an uncompressed certificate chain, wherein the uncompressed certificate chain includes the first data entry in place of the first index.

9. The computer-implemented method of any of clauses 1-8, further comprising determining, at the neighboring node, that the second mapping does not include the first data entry, and incorporating the first data entry into the second mapping at a position that corresponds to the first index.

10. Some embodiments include a computer-implemented method for performing an authentication procedure when joining a wireless network, comprising receiving a compressed certificate chain from a neighboring node, decompressing the compressed certificate chain based on a first mapping to generate a decompressed certificate chain, wherein the compressed certificate chain includes a first index and the decompressed certificate chain includes a first data entry in place of the first index, and performing an authentication procedure with the neighboring node based on the first data entry.

11. The computer-implemented method of clause 10, wherein decompressing the compressed certificate chain comprises determining that the first mapping includes the first index, determining that the first index corresponds to the first data entry in the first mapping, and replacing the first index with the first data entry in the certificate chain.

12. The computer-implemented method of any of clauses 10-11, further comprising extracting a second data entry from the compressed certificate chain, determining that the first mapping does not include the second data entry, and incorporating the second data entry into the first mapping at a position that corresponds to a second index.

13. The computer-implemented method of any of clauses 10-12, further comprising determining that the authentication procedure has completed, and in response, flushing the second data entry and the second index from the first mapping.

14. The computer-implemented method of any of clauses 10-13, further comprising determining that the compressed certificate chain is compressed, and in response, preventing the compressed certificate chain from being stored in a cache memory.

15. The computer-implemented method of any of clauses 10-14, wherein the certificate chain comprises a chain of X.509 certificates, and the first data entry comprises at least one of a field name and a field value included in the chain of X.509 certificates.

16. The computer-implemented method of claim 10, wherein the authentication procedure comprises a certificate exchange that, when completed, establishes an authenticated communication channel with the neighboring node.

16. The computer-implemented method of any of clauses 10-15, wherein the authentication procedure comprises a certificate exchange that, when completed, establishes an authenticated communication channel with the neighboring node.

17. Some embodiments include a wireless network, comprising a first node that includes a first memory storing a first set of instructions, and a first processor that executes the first set of instructions to perform the steps of compressing a certificate chain to generate a compressed certificate chain, and transmitting the compressed certificate chain across the wireless network, and a second node that includes a second memory storing a second set of instructions, and a second processor that executes the second set of instructions to perform the steps of receiving the compressed certificate chain, decompressing the compressed certificate chain to generate a decompressed certificate chain, and performing an authentication procedure with the first node based on the decompressed certificate chain.

18. The wireless network of clause 17, wherein the first processor compresses the certificate chain by determining that the certificate chain includes a first data entry, determining that a first mapping also includes the first data entry, determining that the first data entry corresponds to a first index in the first mapping, and replacing the first data entry with the first index in the certificate chain.

19. The wireless network of any of clauses 17-18, wherein first data entry includes a greater number of bits than the size of the first index in bits, and the certificate chain includes a greater number of bits than the compressed certificate chain.

20. The wireless network of any of clauses 17-19, wherein the second processor decompresses the compressed certificate chain by determining that the compressed certificate chain includes a first index, determining that a second mapping also includes the first index, determining that the first index corresponds to the first data entry in the second mapping, and replacing the first index with the first data entry in the certificate chain.

21. The wireless network of any of clauses 17-20, wherein the second processor performs the additional steps of extracting a second data entry from the compressed certificate chain, determining that a second mapping does not include the second data entry, and incorporating the second data entry into the second mapping at a position that corresponds to a second index.

22. The wireless network of any of clauses 17-21, wherein the certificate chain comprises a chain of X.509 certificates, and a first data entry included in the chain of X.509 certificates comprises at least one of a field name and a field value.

23. The wireless network of any of clauses 17-22, wherein compressing the certificate chain comprises performing an elliptic curve compression operation on a public key portion of the certificate chain.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:
receiving, by a node of a mesh network, a shared compression dictionary including a static portion and a dynamic portion, the shared compression dictionary storing associations between one or more data entries in certificate chains and one or more indices in corresponding compressed certificate chains;
compressing, by the node, a first certificate chain based on the shared compression dictionary to generate a compressed certificate chain,
wherein:
the first certificate chain includes a first data entry and a second data entry,
the compressed certificate chain includes a first index in place of the first data entry, and
the static portion of the shared compression dictionary includes a first mapping between the first index and the first data entry;
storing, by the node and in the dynamic portion of the shared compression dictionary, a second mapping between the second data entry and a second index; and
transmitting, by the node, the compressed certificate chain to a neighboring node to perform an authentication procedure with the neighboring node based on the first data entry.

2. The method of claim 1, wherein the first data entry includes a greater number of bits than a size of the first index in bits, and the first certificate chain includes a greater number of bits than the compressed certificate chain.

3. The method of claim 1, wherein the first certificate chain comprises a chain of X.509 certificates, the first data entry comprises at least one of a field name and a field value included in the chain of X.509 certificates, and wherein the authentication procedure comprises a certificate exchange that, when completed, establishes an authenticated communication channel with the neighboring node.

4. The method of claim 1, wherein compressing the first certificate chain comprises:
determining that the first mapping includes the first data entry;
determining that the first data entry corresponds to the first index in the first mapping; and
replacing the first data entry with the first index in the first certificate chain.

5. The method of claim 1, wherein compressing the first certificate chain comprises:
identifying the second data entry; and
determining that the static portion of the shared compression dictionary does not include the second data entry.

6. The method of claim 5, further comprising flushing the second data entry and the second index from the dynamic portion of the shared compression dictionary when the authentication procedure has completed.

7. The method of claim 1, wherein the static portion of the shared compression dictionary is received and at least partially pre-populated with a first set of data entries during manufacturing of the node, or in response to the node joining the mesh network.

8. The method of claim 1, further comprising:
decompressing, at the neighboring node, the compressed certificate chain based on a second shared compression dictionary to generate an uncompressed certificate chain, the second shared compression dictionary including a second static portion and a second dynamic portion;
determining, at the neighboring node, that the second shared compression dictionary does not include the second data entry; and
incorporating a second mapping between a second index and the second data entry into the second dynamic portion of the second shared compression dictionary.

9. The method of claim 1, wherein compressing the first certificate chain does not replace a first occurrence of the second data entry in the compressed certificate chain.

10. A method, comprising:
receiving, by a node of a mesh network, a shared compression dictionary including a static portion and a dynamic portion, the shared compression dictionary storing associations between one or more data entries in certificate chains and one or more indices in corresponding compressed certificate chains;
receiving, by the node after receiving the shared compression dictionary, a compressed certificate chain from a neighboring node;
decompressing, by the node, the compressed certificate chain based on the shared compression dictionary to generate a decompressed certificate chain, wherein:
the compressed certificate chain includes a first index, and
the decompressed certificate chain includes a first data entry in place of the first index, and
the static portion of the shared compression dictionary includes a first mapping between the first index and the first data entry;
storing, by the node and in the dynamic portion of the shared compression dictionary, a second mapping between a second index and a second data entry included in the compressed certificate chain; and
performing, by the node, an authentication procedure with the neighboring node based on the first data entry.

11. The method of claim 10, wherein decompressing the compressed certificate chain comprises:
determining that the first mapping includes the first index;
determining that the first index corresponds to the first data entry in the first mapping; and
replacing the first index with the first data entry in the decompressed certificate chain.

12. The method of claim 10, further comprising:
extracting the second data entry from the compressed certificate chain; and
determining that the static portion of the shared compression dictionary does not include the second data entry.

13. The method of claim 12, further comprising:
determining that the authentication procedure has completed; and
in response, flushing the second data entry from the dynamic portion of the shared compression dictionary.

14. The method of claim 10, further comprising:
determining that the compressed certificate chain is compressed; and
in response, preventing the compressed certificate chain from being stored in a cache memory.

15. The method of claim 10, wherein the decompressed certificate chain comprises a chain of X.509 certificates, and the first data entry comprises at least one of a field name and a field value included in the chain of X.509 certificates.

16. The method of claim 10, wherein the authentication procedure comprises a certificate exchange that, when completed, establishes an authenticated communication channel with the neighboring node.

17. A wireless network, comprising:
a first node that includes:
a first memory storing a first set of instructions, and
a first processor that executes the first set of instructions to perform the steps of:
receiving a shared compression dictionary including a static portion and a dynamic portion, the shared compression dictionary storing associations between one or more data entries in certificate chains and one or more indices in corresponding compressed certificate chains,
compressing a first certificate chain based on the shared compression dictionary to generate a compressed certificate chain, wherein (i) the first certificate chain includes a first data entry and a second data entry, (ii) the compressed certificate chain includes a first index in place of the first data entry, and (iii) the static portion of the shared compression dictionary includes a first mapping between the first index and the first data entry,
storing, in the dynamic portion of the shared compression dictionary, a second mapping between the second data entry and a second index, and
transmitting the compressed certificate chain across the wireless network; and
a second node that includes:
a second memory storing a second set of instructions, and
a second processor that executes the second set of instructions to perform the steps of:
receiving a second shared compression dictionary including a second static portion and a second dynamic portion, receiving the compressed certificate chain after receiving the second shared compression dictionary, decompressing the compressed certificate chain based on the second shared compression dictionary to generate a decompressed certificate chain, storing, in the second dynamic portion of the second shared compression dictionary, the second mapping between the second data entry and eth second index, and performing an authentication procedure with the first node based on the decompressed certificate chain.

18. The wireless network of claim 17, wherein the first processor compresses the first certificate chain by:
determining that the first certificate chain includes the first data entry;
determining that the first mapping also includes the first data entry;
determining that the first data entry corresponds to the first index in the first mapping; and
replacing the first data entry with the first index in the first certificate chain.

19. The wireless network of claim 18, wherein the first data entry includes a greater number of bits than a size of the first index in bits, and the first certificate chain includes a greater number of bits than the compressed certificate chain.

20. The wireless network of claim 18, wherein the second processor decompresses the compressed certificate chain by:
determining that the compressed certificate chain includes the first index;
determining that the second shared compression dictionary also includes the first index;
determining that the first index corresponds to the first data entry in the second shared compression dictionary; and
replacing the first index with the first data entry in the decompressed certificate chain.

21. The wireless network of claim 18, wherein the second processor performs additional steps of:
extracting the second data entry from the compressed certificate chain; and
determining that the second dynamic portion of the second shared compression dictionary.

22. The wireless network of claim 17, wherein the first certificate chain comprises a chain of X.509 certificates, and the first data entry included in the chain of X.509 certificates comprises at least one of a field name and a field value.

23. The wireless network of claim 17, wherein compressing the first certificate chain comprises performing an elliptic curve compression operation on a public key portion of the first certificate chain.

* * * * *